HARMONIC GENERATOR AND FREQUENCY MULTIPLIER BIASING SYSTEM

Filed Aug. 24, 1965 2 Sheets-Sheet 1

INVENTOR
ARTHUR UHLIR, JR.
BY Alfred H. Rosen
Thomas N. Tarrant
ATTORNEYS

Aug. 13, 1968 A. UHLIR, JR 3,397,369

HARMONIC GENERATOR AND FREQUENCY MULTIPLIER BIASING SYSTEM

Filed Aug. 24, 1965 2 Sheets-Sheet 2

INVENTOR
ARTHUR UHLIR, JR.

By, [signature]
[signature]
ATTORNEYS

United States Patent Office 3,397,369
Patented Aug. 13, 1968

3,397,369

HARMONIC GENERATOR AND FREQUENCY MULTIPLIER BIASING SYSTEM

Arthur Uhlir, Jr., Weston, Mass., assignor to Microwave Associates, Incorporated, Burlington, Mass., a corporation of Massachusetts Filed Aug. 24, 1965, Ser. No. 482,148
14 Claims. (Cl. 332—52)

This invention relates to nonlinear reactance harmonic generators and in particular to biasing the nonlinear reactance of such generators with a nonlinear resistance.

Varactors have come into popular use as a nonlinear reactance for harmonic generators. These as well as other nonlinear reactance devices change reactance with a change in applied voltage. One characteristic of these devices is what may be called "dynamic detuning." In a voltage-variable nonlinear capacitance this term means the variation of effective capacitance as the AC driving voltage is varied. The result is a different dynamic behavior for small and large signals. As the input power is varied, a harmonic generator circuit employing a varactor diode shows variations in its resonant frequency and also variations in the resistive component of its dynamic impedance. The character of such variations depends upon the manner in which the varactor is biased. In many present harmonic generator circuits, the varactor is self-biased through the action of the small but finite rectification capabilities of the varactor diode. For effective self-biasing, careful selection of varactor characteristics for the particular application plus use of appropriate shunt resistance across the varactor is necessary. These measures are still not adequate for efficient, low-distortion operation when wide variations in signal input power are present. Dynamic detuning produces a nonlinear variation in output power as the input power or input frequency is varied.

When the signal level can be expected to remain fairly consistent, the objectional features of self-biasing (such as slow response and criticality of diode characteristics) can be overcome by using an independent fixed bias arrangement. This independent fixed bias arrangement is complicated by the necessity of isolating RF signals from the bias supply and isolating the harmonic generator from "noise" in or picked up by the bias supply. Both the self-bias and the fixed bias arrangements are subject to variations due to ambient temperature unless temperature compensating or temperature-independent components are utilized.

The output of a varactor frequency multiplier can be varied from maximum efficiency down to practically zero by changing the DC bias on the varactor. Since a varactor draws little DC current, no substantial steady-state power is required for this type of control.

Biasing to control the output can be used to stabilize the output with respect to disturbing influences such as variations in temperature and input power, as desired. The applications of this technique must be adjusted according to the desired results, which in some cases may be diametrically opposed to those required at other times. Thus, a successful stabilization of the output for variable input would make a multiplier useless in faithfully reproducing amplitude modulation of the input.

The present invention provides flexibility of bias control without an external bias supply by separating the nonlinear reactance function of the varactor generator and the rectifying function for bias between two components. A nonlinear resistance diode is connected to detect part of the signal and supply it to the varactor for bias. Either the input signal, output signal or a combination of both can be used for this purpose. Use of the input signal makes the bias independent of oscillations in the harmonic resonant tanks minimizing the problems of dynamic detuning.

The output signal can be used to stabilize the output and combinations of input and output can be used to preserve a linear relation between input and output. Thus it is an object of the invention to define biasing means for a varactor harmonic generator.

It is a further object of the invention to define means to bias a varactor harmonic generator as a function of input signal.

It is a further object to define means to bias varactor harmonic generators as a function of output signal.

It is still a further object of the invention to define means to bias a varactor harmonic generator as a combined function of input and output signals.

Another object of the invention is to define a harmonic generator in which the harmonics are generated by a voltage-variable reactance diode and the bias voltage of the reactance diode is applied by a voltage-variable resistance diode.

Still another object of the invention is to define means to reduce the noise content of the output of varactor harmonic generators.

Further objects and features of the invention will be understood upon reading the following description together with drawings in which:

FIG. 1 is given to show typical variation in output of a varactor harmonic generator with change in bias on the varactor. It will be noted that the relationship is not linear.

Figure 2:
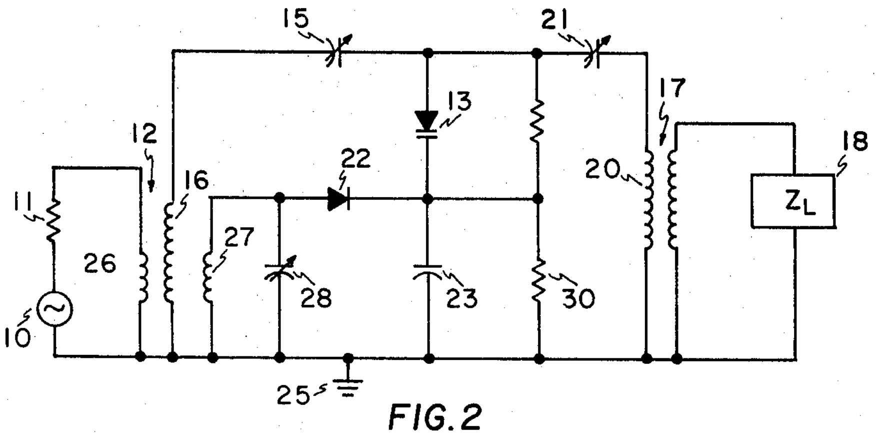
FIG. 2 is a schematic showing a shunt type varactor harmonic generator biased by the input signal.

FIG. 2 shows one embodiment of a harmonic generator in accordance with the invention. The input of this harmonic generator is represented by AC source 10 and source impedance 11. Source 10 is coupled by transformer 12 across varactor diode 13. Capacitor 15 together with transformer winding 16 and the dynamic capacitance of varactor diode 13 form a first resonant circuit which is resonant to the fundamental frequency. A second transformer 17 couples the harmonic generator to an output load 18. The primary winding 20 of transformer 17 together with capacitor 21 and the dynamic capacitance of varactor diode 13 form a second resonant circuit resonant to a harmonic, for example the second harmonic of the fundamental frequency. Bias is applied to varactor diode 13 by varistor diode 22 connected with its cathode end connected to the cathode of varactor diode 13. For direct current and frequencies much less than the fundamental, this common connection of the two diodes is isolated from the reference side of the input and output circuits by a blocking capacitor 23. The reference side of the input and output is represented by ground symbol 25. Voltage is picked up by diode 22 from input winding 26 of transformer 12 by inductive coupling 27. This coupling is adjustable by variable capacitor 28. A resistor network 30 is connected from the anode of varactor diode 13 to reference with a tap connecting it to the common connection of diode 13 and 22.

Since the operation of this circuit and the following circuits as harmonic generators is well known, the operation need only be discussed from the point of view of biasing the varactor diode. As a signal is introduced by source 10, coupling 27 picks up some of the input signal directly from input winding 26 of transformer 12. This signal is detected by diode 22 and applied as a reverse bias to diode 13. Provided that the amplitude of this bias varies in a fairly linear fashion with the amplitude of the input signal from source 10, the amplitude of any harmonic from the varactor will also vary linearly with the amplitude of the input signal. By separating varistor and varactor functions it has been possible to obtain better linearity between the input signal and the bias voltage, since each device can be designed for optimum performance of its separate function. While the distinctions between varactor and varistor diodes are of degree rather than kind, they can be defined as used herein. Thus a varistor is a semiconductor diode in which the conductance is greater than the capacitive susceptance and a varactor is a semiconductor diode in which the conductance is less than the capacitive susceptance. Further, for the present invention, it is preferable that the internal impedance of the varactor as a rectifier be greater than the internal impedance of the varistor circuit. As long as this is so the varistor will dominate the self-bias of the varactor. If the varactor's internal impedance as a rectifier should be less than that of the varistor circuit, then the self-biasing action of the varactor would disturb the bias control. Resistor network 30 determines time constants selected to permit the bias voltage of varactor 13 to follow desired variations of input signal.

Figure 3:
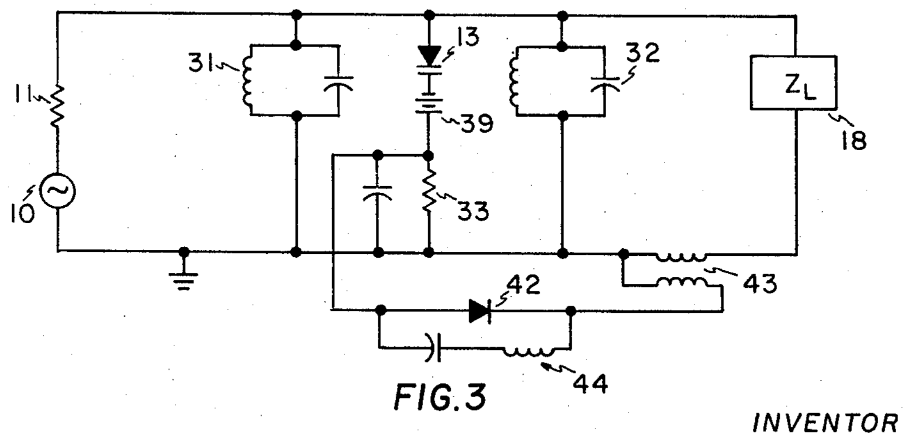
FIG. 3 is a schematic showing a second embodiment of a shunt type varactor harmonic generator biased by the output signal.

FIG. 3 shows a negative feedback variation in which the input source is directly connected to the harmonic generator. Instead of using transformer coupling, the series resonant tanks of FIG. 2 are replaced in FIG. 3 by parallel resonant tanks 31 and 32. These parallel resonant tanks provide a return to reference for the anode of varactor diode 13. The time constant for bias voltage is determined by a resistor 33 connected between the cathode of varactor 13 and reference. Depending on the desired time constant, a capacitor may be connected in shunt with resistor 33. FIG. 3 also illustrates the use of a separate inductive coupling 43 between the output signal line and varistor 42. A feedback circuit of the type illustrated in FIG. 3 can rely on self-bias of the varactor for primary bias or bias can be supplied separately by feed forward or fixed bias as by battery 39.

In the circuit of FIG. 3, a discriminator network 44 has been added across varistor 42 for FM to AM conversion. When this circuit is used with an FM signal of constant amplitude, compensation for frequency modulated noise is obtained. The FM output signal is applied to varistor 42 and discriminator network 44 by transformer 43. The varistor and network 44 apply a bias to varactor diode 13 which varies in amplitude with variation in output frequency. Again, the time constant must be selected for reducing noise with relation to signal. The bias applied to varactor 13, in this embodiment, produces a phase change in the FM signal to reduce the frequency modulation that is attributable to noise.

Varistor feedback can be operated to maintain the output amplitude or frequency constant or, using a very short time constant, to reduce noise. For feedback operation, the circuit must be designed so that the varactor will always be operating on the same side of the bias vs. harmonic output curve (see FIG. 1). For example, the operating bias can be set at a value below the bias for which output is maximized. Then small increase in bias voltage will increase harmonic output and decreasing bias voltage will always decrease harmonic output. To reduce amplitude modulation noise in the multiplier output, the feedback circuit of FIG. 3 is connected so that an increase in the rectified voltage of varistor reduces the harmonic generator output. It will be recognized that noise reduction at a given frequency difference from the output frequency requires that the feedback circuit respond at a frequency equal to the frequency difference. Fortunately, in many applications the noise reduction is required only for specified frequency bands: commonly, in a one-megacycle band ±30 megacycles from the output frequency. It is then necessary only to control the frequency response of the feedback circuit in and near a one-megacycle band at 30 megacycles.

The suppression of amplitude modulation noise by feedback, as just described, and the facilitation of amplitude modulation, as described previously, are mutually incompatible and generally serve different applications: intentional modulation for radio transmission and noise suppression for local oscillator use in receivers. However, it is possible to incorporate both actions in the same multiplier when the intentional modulation and suppressed noise are of distinctly different frequencies.

In frequency modulation systems, as commonly used for microwave relay, frequency modulation noise is even more serious than amplitude modulation noise. To apply negative feedback to the correction of frequency modulation noise, the output sample is first passed through a filter network which converts the frequency modulation noise to amplitude modulation noise before rectification by the varistor 42.

Figure 4:
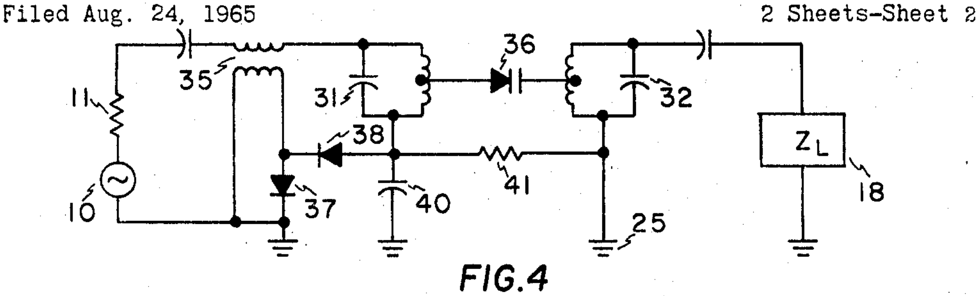
FIG. 4 is a schematic showing a series type harmonic varactor using a voltage doubler circuit to bias from the input signal.

In FIG. 4 a harmonic generator is shown using a series varactor 36 and parallel reasonant tanks 31 and 32. In this particular embodiment, the biasing arrangement is shown as using two diodes 37 and 38 in a voltage-doubling arrangement. In some harmonic generators particularly where large signals are used, it has been found useful to increase the applied bias voltage by arrangements of two or more diodes in voltage doubling or adding arrangements. In FIG. 4 the bias voltage is applied to varactor 36 through resonant tank 31 and 32. In the depicted arrangement the anode of diode 38 is connected through resonant tank 31 to the anode of varactor 36 and the cathode of varactor 36 is returned to reference through resonant tank 32. A DC blocking capacitor 40 is connected between the anode of diode 38 and reference and a resistance element 41 is connected between the anode of diode 38 and reference to establish the time constant of the bias circuit.

Figure 1:
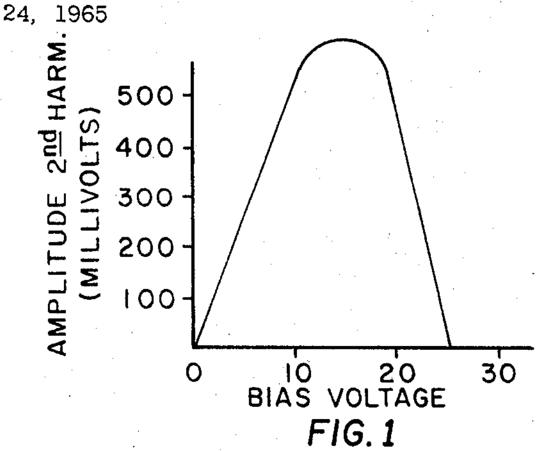
FIG. 1 is a graph that shows the amplitude variation in harmonic output of a varactor diode vs. bias voltage.
Figure 5:
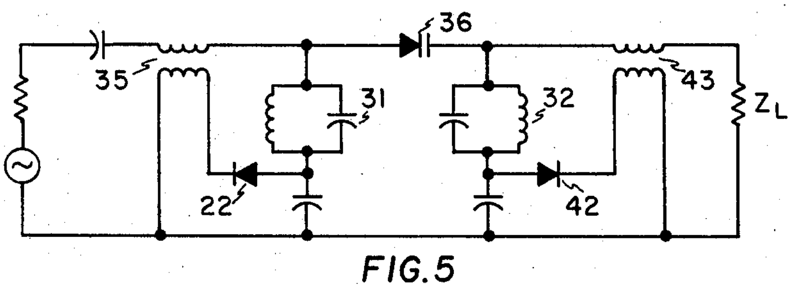
FIG. 5 is a schematic showing a series type harmonic generator biased from both input and output circuits.

FIG. 5 illustrates a harmonic generator essentially the same as that of FIG. 4 except that it used biasing both as a function of the input and output signals in combination. Diode 22 in FIG. 5 detects part of the input signal from inductive coupling 35 and applies it through parallel resonant tank 31 to the anode of varactor 36 as a reverse bias. Diode 42 detects a portion of the output signal from inductive coupling 43 and applies it through parallel resonant tank 32 to the cathode of varactor 36 as forward bias. Thus the bias applied from the input signal tends to place varactor 36 in condition for optimum efficiency while the bias fed back from the output by varistor 42 tends to stabilize the output by reducing the applied reverse bias across varactor 36 as the output signal increases. With proper selection of time constants, various types of output stabilization can be obtained with this arrangement. For example, the output can be made relatively linear with input or can be made relatively stable independent of input. Since the bias fed back from the output in FIG. 5 operates much the way of negative feedback, it can be used to minimize a large variety of undesired effects. It will be understood that in a circuit such as FIG. 5 the biasing circuits will have to be designed so that the overall bias on varactor 36 is a reverse bias. In this as well as in other embodiments using feedback, it is preferable to design the circuit parameters so that the varactor will never be biased so as to cross the peak of the bias voltage vs. harmonic amplitude, such as illustrated in FIG. 1.

Figure 6:
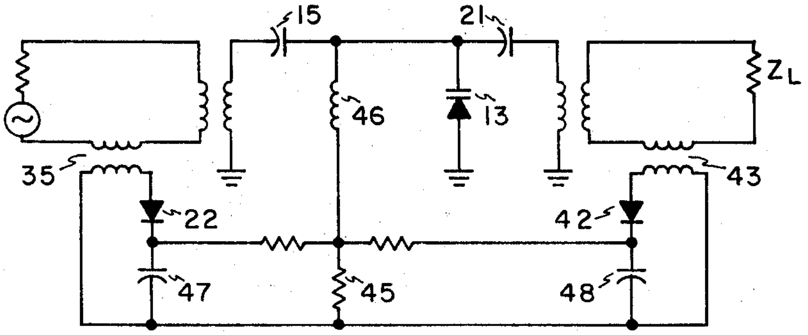
FIG. 6 is a schematic showing a shunt type harmonic generator biased by both input and output circuits; and, FIG. 7 is a schematic showing a shunt type harmonic generator biased from the sum of the voltages obtained from the input and output circuits.

FIG. 6 illustrates a harmonic generator similar to that of FIG. 2. In FIG. 6, however, biasing is applied by varistors inductively coupled both to the input and to the output circuits. In FIG. 6 both biasing signals detected from the input and output circuits are polarized to reverse bias varactor 36. These signals are compared in a voltage divider network 45 and are coupled through an RF choke 46 to one electrode of varactor 36. Capacitors 15 and 21 in the harmonic resonant circuits and capacitors 47 and 48 connected between diodes 22 and 42 respectively and ground serve to block the applied bias voltage from reference.

Figure 7:
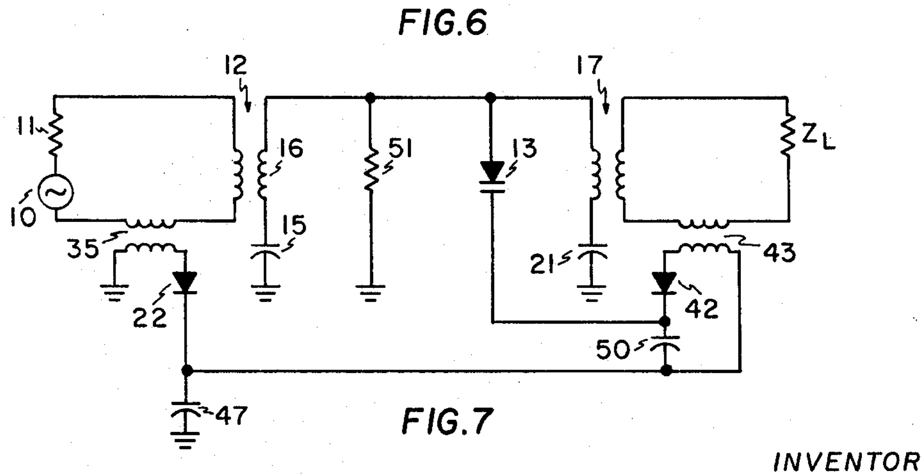

FIG. 7 illustrates an embodiment of the invention which is similar to that of FIG. 6 but has an advantage when greater bias voltage is necessary in that the bias voltage detected from the output signal is added to the bias voltage detected from the input signal. As in FIG. 6, the input from source 10 is transformer 12 coupled to varactor 13 through a series resonant circuit. A varistor diode 22 is inductively coupled to the input signal through coupling 35 and develops a DC voltage across a blocking capacitor 47. This voltage is added to a voltage developed by varistor diode 42 across a second capacitor 50 connected between the cathode of diode 22 and the cathode of diode 42. The cathode of diode 42 is also connected to the cathode of varactor 13. A resistor 51 is connected from the anode of varactor 13 to reference as a bleeder resistor. The arrangement of FIG. 7 is beneficial in developing the greatest possible efficiency from varactor 13 since the reverse bias across the varactor will increase as a function of signal increase in both the input and output circuits.

As is apparent, the various biasing circuits shown in the above described embodiments can readily be interchanged one with another in the different harmonic generating circuits illustrated with slight modifications in the connecting circuitry. In the embodiments illustrated above, DC voltage is produced by sampling a portion of the fundamental power and detecting it in such a way that the resulting DC voltage is a slower varying function of the input power. Desirable limiting action can be inherent in the detector or it can be an RF limiter operating on the input to the detector or it can be a nonlinear circuit operating on the DC output of the detector. Limiting action can also be a combination of these elements arranged so that their temperature effects are mutually compensatory providing a more nearly constant DC voltage that varied with temperature in such a way as to compensate for the varactor's remaining temperature dependence.

Sampling of the fundamental power at the input can be done with any sampling device such as a probe, loop or directional coupling. With full varactor bias supplied by separate varistors, the residual rectification of the varactor is a complicating factor. Nonlinear passive circuits connected to the DC output of the varactor can compensate for some variations. For example, a normal diode forward characteristic could be used to bleed off the rectified voltage resulting in a lower operating bias voltage but one fairly constant with temperature. If a high bias is desirable, diodes in series could be used or a Zener diode.

It cannot be expected in general that the rectification characteristics of a varactor will operate adequately in a stabilizing direction. Often the reverse is true. The external detector can easily be made to override the self-bias.

The separation of the detection and harmonic generating characteristics makes for simplified varactor manufacture. Instead of trying to provide a controlled degree of rectification the varactor manufacturer can concentrate on the qualities leading to efficient harmonic generation and worry about rectification only to the extent of making it as small as possible.

Time delay in the RF sampling and DC combining networks can delay the application of all or part of the bias so that start-up is aided rather than resisted by the control network. Applying the inventive concept to multiplier chains provides even more versatility. In multiplier chains the basic DC bias is economically obtained for all stages by rectification of the fundamental input power. Feedback loops can be built around the individual stages and around combination stages. The types of noise that can be removed from the output of a multiplier or chain of multipliers depends upon the noise of the detectors and the band pass of the feedback networks. Amplitude modulation noise present in the input as well as noise generated by the varactors or other circuit components, can be reduced.

While the invention has been described in relation to the specific embodiments in which the varactors are reversed biased as is the more common condition, it has been found that with exceedingly low power levels the present invention permits a very small forward bias giving better efficiency at these levels.

What is claimed is:

1. A frequency multiplier comprising an input circuit resonant at a fundamental frequency, an output circuit resonant at a harmonic of said fundamental frequency, a voltage-variable reactance diode connected between said input circuit and said output circuit to generate harmonics of said fundamental frequency, and means to bias said reactance diode as a function of signal amplitude comprising: a voltage-variable resistance diode, means to couple at least one of said input circuit and said output circuit to said resistance diode independently of said reactance diode and means to connect said resistance diode to said reactance diode whereby a DC bias voltage is applied to said reactance diode.

2. A frequency multiplier according to claim 1 wherein one electrode of said resistance diode is connected to said means to couple and the other electrode of said resistance diode is directly connected to said reactance diode.

3. In a harmonic generator comprising an input circuit resonant at a fundamental frequency, an output circircuit resonant at a harmonic of said fundamental frequency, a voltage-variable reactance diode connected between said input circuit and said output circuit to generate harmonics of said fundamental frequency, and means to bias said reactance diode for efficient harmonic generation the combination in said means to bias comprising a voltage-variable resistance diode, means to couple said input circuit to said resistance diode independently of said reactance diode and means to connect said resistance diode to said reactance diode whereby a DC bias voltage is applied to said reactance diode as a function of input signal amplitude.

4. A frequency multiplier comprising:

(a) a series resonant input circuit resonant at a fundamental frequency;
(b) a series resonant output circuit resonant at a harmonic of said fundamental frequency;
(c) a varactor diode connected in series with both said input circuit and said output circuit in common;
(d) a varistor diode with one electrode coupled loosely to one of said series resonant circuits; and,
(e) a connection between a second electrode of said varistor diode and one electrode of said varactor diode for applying a bias voltage to said varactor diode.

5. A frequency multiplier according to claim 4 in which said varistor diode is inductively coupled to said series resonant input circuit.

6. A frequency multiplier according to claim 4 in which said connection connects the cathode of said varistor diode directly to the cathode of said varactor diode.

7. A varactor frequency multiplier in which the varactor is biased by a voltage independently detected from the input signal comprising:

(a) a load line and a reference line;
(b) a parallel resonant circuit resonant to the fundamental of an input frequency connected between said load line and said reference line;

(c) a parallel resonant circuit resonant to a harmonic of said fundamental connected between said load line and said reference line;

(d) a varactor diode connected between said load line and said reference line;

(e) means to couple an input signal between said load line and said reference line;

(f) means to couple one electrode of a varistor diode to said means to couple an input signal;

(g) a connection between a second electrode of said varistor diode and one electrode of said varactor diode; and, (h) an impedance element connected between said one electrode of said varactor and said reference line for isolating said second electrode from said reference line.

8. A frequency multiplier comprising:

(a) signal input means;

(b) a first circuit resonant at a fundamental frequency connected to said input means;

(c) a second circuit resonant to a harmonic of said fundamental;

(d) a varactor diode connected as a common circuit element in said first circuit and said second circuit for generating said harmonic;

(e) signal output means connected to said second circuit;

(f) a varistor diode coupled to said signal output means for applying a portion of the output signal to a first electrode of said varistor; and, (g) a connection between the second electrode of said varistor and the opposite polarity electrode of said varactor for applying a voltage proportional to said output signal as negative feedback to reduce the efficiency of harmonic generation in said varactor in proportion to undesired variations in output.

9. A frequency multiplier comprising:

(a) means to connect an input signal to a first circuit resonant at the input signal frequency;

(b) means to connect an output load to a second circuit resonant at a harmonic of said input signal;

(c) a varactor diode connected between said first circuit and said second circuit for generating harmonics of said input signal;

(d) an inductive coupling connected to said first named means to connect an input signal;

(e) a first diode connected to said inductive coupling for detecting a portion of said input signal;

(f) a varistor diode connected to said first diode in a voltage adding arrangement; and, (g) means to connect said varistor diode to said varactor diode so as to apply a reverse bias to said varactor diode as a function of said input signal amplitude.

10. A frequency multiplier comprising:

(a) signal input means for providing a signal at a first frequency;

(b) signal output means operative at a harmonic of said first frequency;

(c) means to couple said input means to a varactor for generating said harmonic;

(d) means to selectively couple said harmonic from said varactor to said signal output means; and, (e) varistor means coupled to said input means, said output means and said varactor for biasing said varactor as a combined function of input and output signals.

11. A frequency multiplier according to claim 10 in which said varistor means comprises a first varistor diode inductively coupled to said input means and connected in a series circuit with said varactor polarized to reverse bias said varactor and a second varistor diode inductively coupled to said output means and connected in a series circuit with said varactor polarized to forward bias said varactor in opposition to the bias applied by said first varistor.

12. A frequency multiplier according to claim 10 wherein said varistor means comprises a first varistor coupled to said input means and detecting a DC voltage proportional to the amplitude of said signal at a first frequency, a second varistor coupled to said output means and detecting a DC voltage proportional to the amplitude of said signal at said harmonic, and a resistive junction connected to said varactor, said first varistor and said second varistor whereby a reverse bias is applied to said varactor as a function of the signals detected by each of said first and second varistors as apportioned by said resistive junction.

13. A frequency multiplier according to claim 10 wherein said varistor means comprises a first varistor diode coupled to said input means, a second varistor diode coupled to said output means, interconnecting circuitry connecting said second varistor to said first varistor in a voltage adding arrangement and a connection between said second varistor and said varactor adapted to bias said varactor with the sum of voltages detected by sadi first varistor and said second varistor.

14. A frequency multiplier comprising:

(a) signal input means;

(b) a first circuit resonant at a fundamental frequency connected to said input means;

(c) a second circuit resonant to a harmonic of said fundamental;

(d) a varactor diode connected as a common circuit element in said first circuit, and said second circuit for generating said harmonic;

(e) signal output means connected to said second circuit;

(f) a varistor diode coupled to said signal output means for applying a portion of the output signal to a first electrode of said varistor;

(g) an FM discriminator network coupled to said signal output means for converting frequency modulation components in an output signal to amplitude modulation as applied to said varistor;

(h) a connection between the second electrode of said varistor and the opposite polarity electrode of said varactor for applying a voltage proportional to frequency variations in said output signal as negative feedback to vary the phase of harmonic generation in said varactor in proportion to and inversely with respect to undesired phase variations in output.

References Cited

UNITED STATES PATENTS

| | | | |
|---|---|---|---|
| 3,025,448 | 3/1962 | Muchmore | 328—16 X |
| 3,085,205 | 4/1963 | Sante. | |
| 3,316,478 | 4/1967 | Polaniecki | 321—69 X |
| 3,341,714 | 9/1967 | Käch | 328—16 X |

ALFRED L. BRODY, *Primary Examiner.*